US009829365B2

(12) United States Patent
Olszewski et al.

(10) Patent No.: US 9,829,365 B2
(45) Date of Patent: Nov. 28, 2017

(54) TACTILE FEEDBACK TECHNIQUES TO LIMIT TEMPERATURE RUNAWAY IN BOILER SYSTEMS

(75) Inventors: Theodore Olszewski, Rocky River, OH (US); John E. Bohan, Jr., Avon Lake, OH (US); Timothy O. Beight, Amherst, OH (US)

(73) Assignee: R.W. Beckett Corporation, North Ridgeville, OH (US)

( * ) Notice: Subject to any disclaimer, the term of this patent is extended or adjusted under 35 U.S.C. 154(b) by 941 days.

(21) Appl. No.: 13/350,915

(22) Filed: Jan. 16, 2012

(65) Prior Publication Data

US 2013/0180473 A1 Jul. 18, 2013

(51) Int. Cl.
*G01F 23/24* (2006.01)
*F24H 9/20* (2006.01)
*F24H 1/18* (2006.01)

(52) U.S. Cl.
CPC ......... *G01F 23/242* (2013.01); *F24H 9/2035* (2013.01); *F24D 2220/042* (2013.01); *F24D 2220/048* (2013.01); *F24H 1/186* (2013.01); *Y10T 29/49826* (2015.01)

(58) Field of Classification Search
CPC .................................................... G01D 23/24
USPC ...................... 122/4 R; 73/290 R, 292, 866.5
See application file for complete search history.

(56) References Cited

U.S. PATENT DOCUMENTS

| | | | | |
|---|---|---|---|---|
| 2,202,197 A | * | 5/1940 | Ewertz | 137/554 |
| 2,410,098 A | * | 10/1946 | Muller | G01K 7/023 |
| | | | | 136/235 |
| 3,290,178 A | * | 12/1966 | Loveland | G01K 1/14 |
| | | | | 136/217 |
| 3,306,109 A | * | 2/1967 | Caparone | F24H 9/0047 |
| | | | | 174/138 R |
| 3,575,193 A | * | 4/1971 | Niewyk | D06F 3/02 |
| | | | | 137/119.01 |
| 3,930,892 A | * | 1/1976 | Fox | F23Q 9/04 |
| | | | | 136/217 |
| 4,179,309 A | * | 12/1979 | Hance et al. | 136/234 |
| 4,259,982 A | * | 4/1981 | Bartels | 137/392 |
| 4,263,587 A | * | 4/1981 | John | 340/620 |
| 4,317,367 A | * | 3/1982 | Schonberger | 374/165 |
| 4,646,569 A | * | 3/1987 | Cosser | 73/304 R |
| 5,048,974 A | * | 9/1991 | Dupuy | G01K 7/22 |
| | | | | 337/107 |
| 5,178,009 A | * | 1/1993 | Arekapudi et al. | 73/292 |
| 5,318,363 A | * | 6/1994 | Mauric | 374/208 |

(Continued)

FOREIGN PATENT DOCUMENTS

DE EP 2169370 A2 * 3/2010 ......... F24D 19/1048

*Primary Examiner* — Nathaniel Herzfeld
(74) *Attorney, Agent, or Firm* — Eschweiler & Potashnik, LLC

(57) ABSTRACT

Some aspects of the present disclosure relate to a sensor probe kit that has an electrical connection that ensures a sensor probe has been properly positioned in a boiler well. In some embodiments, the sensor probe kit has a seating mechanism that positively positions a sensor probe at a predetermined position within a boiler well. In many instances, the seating mechanism provides tactile feedback to an installer when the sensor probe is properly positioned within the boiler well. These features can help ensure the sensor probe is properly installed, and helps keep the sensor probe electrically connected to the well at all times after installation.

5 Claims, 6 Drawing Sheets

(56) References Cited

U.S. PATENT DOCUMENTS

| | | | | |
|---|---|---|---|---|
| 5,340,019 | A * | 8/1994 | Bohan et al. | 236/20 R |
| 6,367,974 | B1 * | 4/2002 | Lin | G01K 1/10 374/150 |
| 6,485,175 | B1 * | 11/2002 | Nimberger et al. | 374/142 |
| 6,546,824 | B2 * | 4/2003 | Easton | G01P 1/026 73/493 |
| 6,904,800 | B2 * | 6/2005 | Merwin | G01F 23/243 340/620 |
| 7,162,150 | B1 * | 1/2007 | Welch et al. | 392/455 |
| 7,243,540 | B2 * | 7/2007 | Merwin | G01F 23/243 73/304 C |
| 7,891,572 | B1 | 2/2011 | Murray | |
| 8,142,073 | B2 * | 3/2012 | Clark | 374/208 |
| 2003/0033897 | A1 * | 2/2003 | Easton | 73/866.5 |
| 2009/0199634 | A1 * | 8/2009 | Tonner | G01F 23/242 73/295 |
| 2011/0260717 | A1 * | 10/2011 | Schleyer | G01P 1/00 324/207.25 |

\* cited by examiner

300
Isometric View

Top view

Front view

TACTILE FEEDBACK TECHNIQUES TO LIMIT TEMPERATURE RUNAWAY IN BOILER SYSTEMS

BACKGROUND

Conventional boilers used in residential and light commercial heating include boiler tanks, which during normal operation, are filled with a conductive boiler fluid (e.g., water) up to at least some predetermined level. To help ensure that adequate boiler fluid is present in a boiler tank at a given time, the fluid level within the tank is monitored with a low fluid cutoff (LFCO) sensor. To help ensure that the temperature of the boiler fluid does not go above a designated temperature, the temperature is monitored with a temperature sensor.

Conventional temperature sensors can adequately monitor the temperature of a fluid within a boiler tank in most situations. However, the inventors have appreciated that conventional temperature sensors are installed without ensuring the sensor has been properly positioned to accurately measure the temperature of the fluid in the boiler. Temperature sensors can also be inadvertently moved within their wells, which can cause them to erroneously report actual boiler fluid temperature. For example, a person, animal, or even an object falling near a boiler can accidently jostle the boiler and/or temperature sensor, and thereby change the position of the temperature sensor such that the temperature sensor no longer accurately measures the boiler fluid temperature. This accidental mis-positioning can ultimately cause an owner to experience an overheated boiler, which in turn can cause damage to the boiler, damage to the structure housing the boiler (e.g. house or commercial building), and/or harm to individuals that are located near the boiler.

In view of these and other shortcomings with conventional LFCO probes and/or temperature sensors, the inventors have devised improved boiler systems as set forth herein.

DETAILED DESCRIPTION

Figure 1:
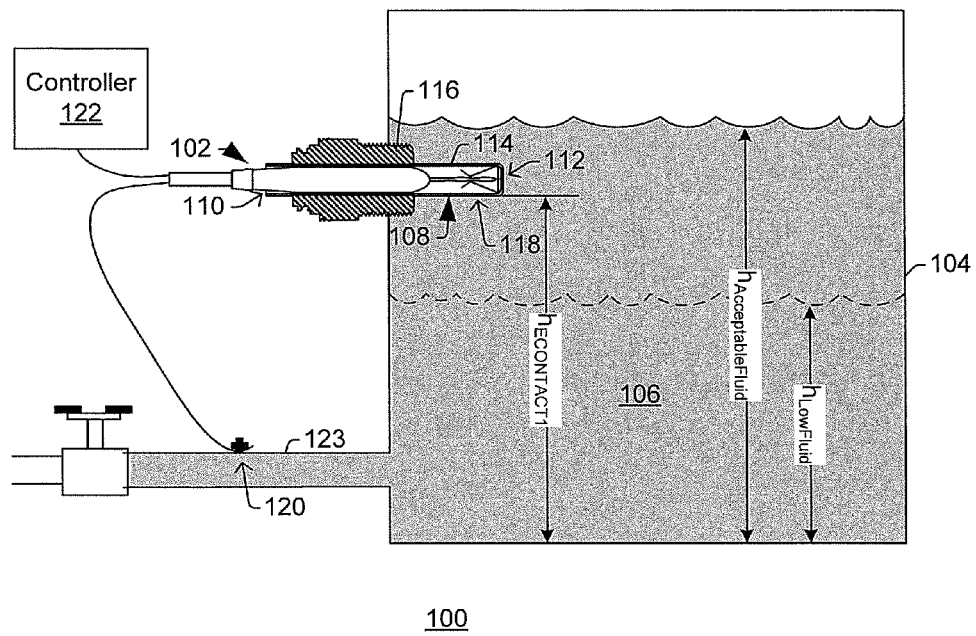
FIG. 1 is a cross-sectional side view of a boiler system in accordance with some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. However, in some embodiments, the claimed subject matter may be practiced without these specific details. Thus, nothing in this detailed description or the appended figures limit the scope of the claimed subject matter in any way.

As will be appreciated in further detail herein, some aspects of the present disclosure relate to a sensor probe kit that has an electrical connection that ensures a sensor probe has been properly positioned in a boiler well. In some embodiments, the sensor probe kit has a seating mechanism that positively positions the sensor probe at a predetermined position within the boiler well. In many instances, the seating mechanism provides tactile feedback to an installer when the sensor probe is properly positioned within the boiler well. These features can help ensure the sensor probe is properly installed, and helps keep the sensor probe electrically connected to the well at all times after installation.

Turning to FIG. 1, one can see a boiler system 100 that makes use of a LFCO sensor probe 102 in accordance with some embodiments. The boiler system 100 includes a boiler tank 104, which holds an electrically conductive fluid 106, such as water for example. A well 108, which is typically mounted into a sidewall of the boiler tank 104, has a well opening 110 and a closed end portion 112 with a tubular sidewall 114 extending there between. A threaded body region 116 can help to secure the well 108 to the boiler tank 104. In some embodiments, the closed end portion 112 and sidewall 114 can be made of an electrically conductive material, such as stainless steel, aluminum, or iron for example; and the body region 116 can be made of a thermoplastic, such as polyphenylene oxide, which can be stable in boiling water or other heated fluids present in the boiler tank 104.

The LFCO sensor probe 102 is structured to be inserted at least partially into the well 108 through the well opening 110. A controller 122 monitors an impedance (or equivalently or current or voltage) between first and second electrical contact elements for example shown as 118, 120. The first and second electrical contacts could be positioned practically anywhere in the boiler system, although they are typically not part of the boiler tank itself. For example, the second electrical contact element could be a point inside the boiler fluid or another point on the tube of the thermo-well itself, or even something else. The first electrical contact element 118 electrically couples the controller 122 to the fluid 106 via well 108, while the second electrical contact 120 is shown as a terminal coupled to a fluid supply pipe 123 screwed into the boiler tank 104. The first and second electrical contact elements 118, 120 are selectively electrically connected to one another based on the level of fluid 106 in the boiler tank 104. For example, when the level of conductive fluid 106 meets or exceeds a first electrical contact height, $h_{ECONTACT1}$ (e.g., when the conductive fluid 106 is at height, $h_{AcceptableFluid}$), the conductive fluid 106 establishes a low-impedance conduction path between the first and second electrical contact elements 118, 120. In contrast, when the level of conductive fluid 106 drops below the first electrical contact height, $h_{ECONTACT1}$ (e.g., when the level of conductive fluid 106 is at position $h_{Lowfluid}$), the low-impedance conduction path between first and second contact elements 118, 120 is broken. Upon detecting a high impedance (low fluid condition) between first and second electrical contact elements 118, 120, the controller 122 can disable a fluid heating element (e.g., a gas burner—not shown), thereby preventing a potentially damaging and/or dangerous boiler condition.

Figure 2:
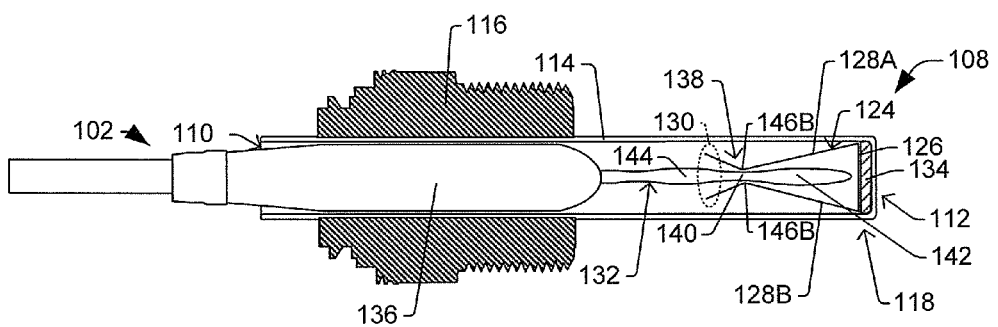
FIG. 2 is a cross-sectional side view of a sensor probe in accordance with some embodiments.

As shown in more detail in FIG. 2, to help ensure the probe 102 is securely positioned in well 108, a well coupling member 124 is inserted into the well 108 and fixedly secured within the well. The well coupling member 124 includes a mounting surface 126 with resilient arms 128A, 128B extending laterally therefrom. The resilient arms 128A, 128B terminate near a receiving region 130, which is configured to receive an elongate member 132 of the sensor probe 102. In many embodiments for ease of installation, the mounting surface 126 is secured near the well's closed end portion 112, although it could also be secured in other regions of the well in other embodiments. In many embodiments, a fastening element 134, such as a weld material, a solder material, an epoxy material, a molded material, a brazed joint, a resin, a screw, a bolt, or a rivet, for example, secures the mounting surface 126 to the closed end portion 112 of the well.

As shown, the probe 102 includes elongate member 132, which extends from probe body 136 and includes one or more positioning elements 138 thereon. The positioning element 138 is structured to engage the well coupling member 124 to secure the sensor probe 102 at a predetermined location within the well 108. This also provides an electrical connection that provides confirmation through an electrical signal that the probe body 136, is positioned properly for temperature measurement. In FIG. 2's embodiment, the positioning element 138 is made up of a narrow-waisted region 140 arranged between first and second bulbous regions 142, 144. Thus, as the probe 102 is slid into the well 108, the tip of elongate member 132 is received by receiving element 130. As probe 102 is pressed further into well 108, resilient arms 128A, 128B are biased outwardly as they receive the first bulbous region 142. As sliding continues, the resilient arms 128A, 128B continue to increase in bias until they experience a relative maximum bias when elbow regions 146A, 146B in the resilient arms 128A, 128B, respectively, reach a crest of the first bulbous region 142. After the elbow regions 146A, 146B pass the crest of the first bulbous region 142, the elbow regions can continue to engage the outer surface of the elongate member 132 as they slide towards the narrow-wasted region 140. As the elbow regions 146A, 146B approach the narrow-waisted region 142, the bias on the resilient arms lessens and the installer can feel the probe 102 "snug" or "snap" into place at a pre-determined location. This "snugging" can correspond to the elbow regions 146A, 146B engaging the narrow-waisted region 140 in this example. Once the probe 102 is "snugged" in, any lateral movement of the probe further into or further out of the well 108 requires some incremental increase in force, due to the engagement of the elbow regions 146A, 146B with the first and second bulbous regions 142, 144. Thus, the positioning element 138 and well coupling member 124 engage one another in a manner that provides positive tactile feedback to an installer to indicate the probe 102 is properly seated at the pre-determined location within the well 108.

As can be appreciated by viewing FIGS. 1-2 concurrently, in many embodiments this manner of positive positioning also helps ensure that controller (122, FIG. 1) maintains electrical contact with the first electrical contact (118, FIG. 1), thereby helping to ensure the controller measures the proper fluid level in the boiler tank (102, FIG. 1). In particular, in FIG. 2's embodiment, the first bulbous region (e.g., 142 in FIG. 2) helps to ensure the probe 102 does not become inadvertently electrically disconnected from the well 108. In some embodiments, the elongate member 132, the well coupling member 124, and the well sidewall 114 and/or end portion 112 are all made of conductive materials, such that a low-impedance electrical path extends through each of these components to couple the controller 122 to the first electrical contact 118. In other embodiments, however, one of more portions of these components can be made, in whole or in part, of an insulating material, so long as an electrically conductive path remains between controller 122 and first electrical contact 118. For example, if the well coupling member 124 is made wholly of insulating material, the elongate member 132 could include a continuous conductive element and the elongate member's tip could electrically contact the well 108 to establish the first electrical contact 118. In other embodiments, the elongate member 132 and well coupling member 124 could both be insulators, and an outer surface of probe body 136 could be electrically coupled to the well side wall 114, thereby providing a conductive path to operably couple the controller 122 to the first electrical contact 118.

Figure 3A:
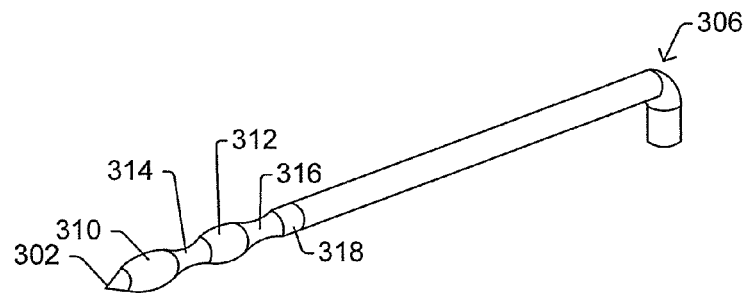
FIG. 3A is an isometric view of an elongate member of a sensor probe in accordance with some embodiments.
Figure 3B:
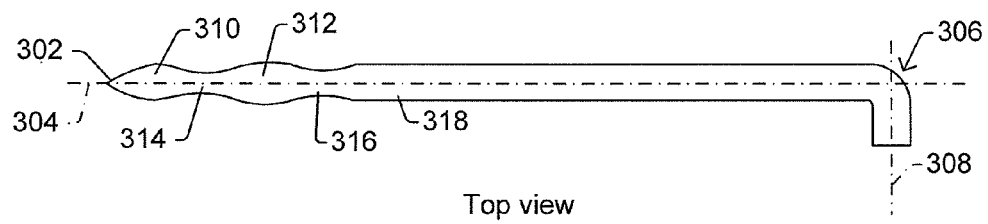
FIG. 3B is a top view of an elongate member of a sensor probe in accordance with some embodiments.
Figure 3C:
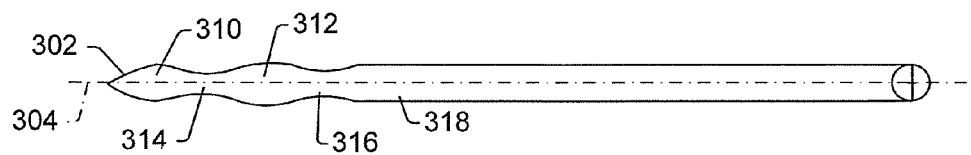
FIG. 3C is a front view of an elongate member of a sensor probe in accordance with some embodiments.
Figure 4A:
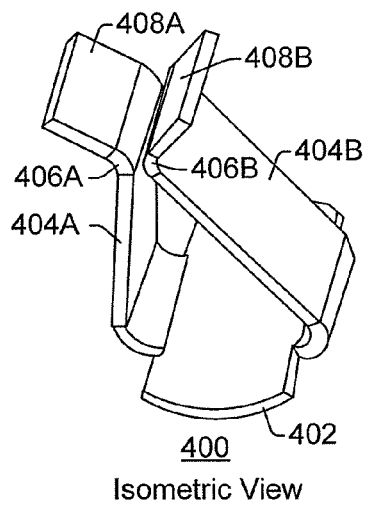
FIG. 4A is an isometric view of a well coupling member in accordance with some embodiments.
Figure 4B:
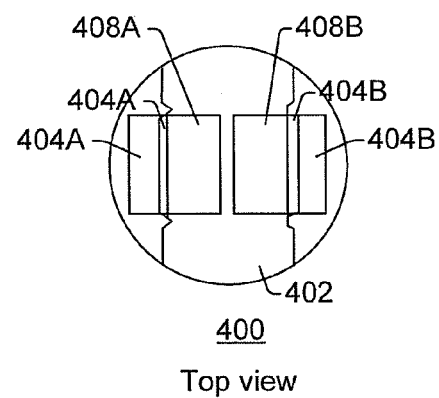
FIG. 4B is a top view of a well coupling member in accordance with some embodiments.
Figure 4C:
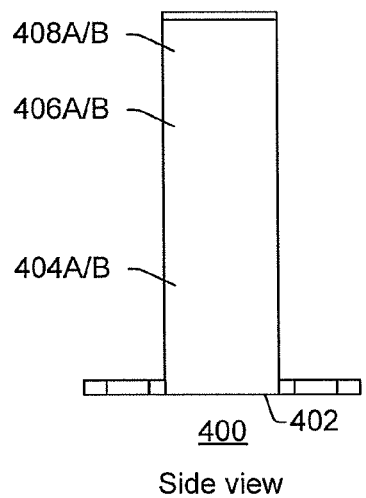
FIG. 4C is a side view of a well coupling member in accordance with some embodiments.
Figure 4D:
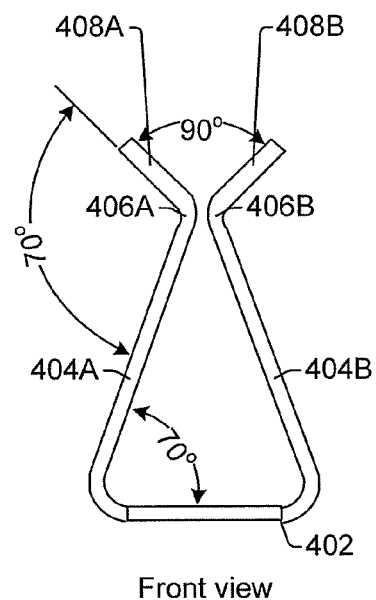
FIG. 4D is a front view of a well coupling member in accordance with some embodiments.

Turning now to FIG. 3A-3C concurrently, one can see an embodiment of an elongate member 300, which can extend from a probe body such as shown in FIG. 2 for example. FIG. 3's elongate member 300 extends laterally from a tip region 302 along a first axis 304 to an elbow region 306. At the elbow region 306, the elongate member 300 extends along a second axis 308, which is approximately perpendicular to the first axis 304. The elongate member includes first and second bulbous regions 310, 312 having a first narrow-waisted region 314 there between. A second narrow-waisted region 316 can be adjacent to the second bulbous region 312, and a tubular region 318 which can also be somewhat bulbous is adjacent to the second narrow-waisted region 314. In many embodiments, the elongate member 300 is made entirely of a conductive material, however, in other embodiments the elongate member can be made entirely of insulating material or can be made of a combination of conductive material and insulating material.

Turning now to FIG. 4A-4D concurrently, one can see a well coupling member 400 (e.g., well coupling member 124 in FIG. 2) in accordance with some embodiments. The well coupling member 400 includes a mounting surface 402, which can be generally planar, concave, or convex for example. Often the geometry of the mounting surface 402 corresponds to that of the closed end portion of the well. One or more resilient arms (e.g., 404a, 404b) extend upwards from the mounting surface 402. In the illustrated embodiment, each resilient arm meets the mounting surface at an angle of approximately 70°. One or more elbows (e.g., 406a, 406b), which couple the resilient arms (e.g., 404a, 404b) to respective forearms (e.g., 408a, 408b), can be angled at approximately 115° in an embodiment. These forearms (e.g., 408a, 408b) can meet at approximately 90° to help guide a tip of an elongated member between the arms towards the mounting surface 402.

Note that the embodiments of FIGS. 3A-3C and FIG. 4A-4D do not in any way limit the scope of the present disclosure. In other embodiments, other types of well coupling elements and other positioning members can be used. For example, rather than a well coupling element including resilient arms (e.g., FIGS. 4A-4D) and a positioning member including a neck region between two adjacent bulbous regions (FIGS. 3A-3C), another well coupling element can comprise a slot, groove or recess formed therein, and a corresponding positioning member can include a finger or other member that engages the slot, groove, or recess. Also, although only two resilient arms are illustrated for well coupling element 400, additional arms or only a single arm can also be present in some embodiments.

In still other embodiments, the positioning element comprises a threaded structure and the receiving element comprises a corresponding threaded structure. In this embodiments, tactile feedback for the installer can occur when the threaded positioning element on the probe reaches the maximum number of turns allowed by the correspondingly threaded receiving element in the well. Other positioning elements could also be used.

Figure 5:
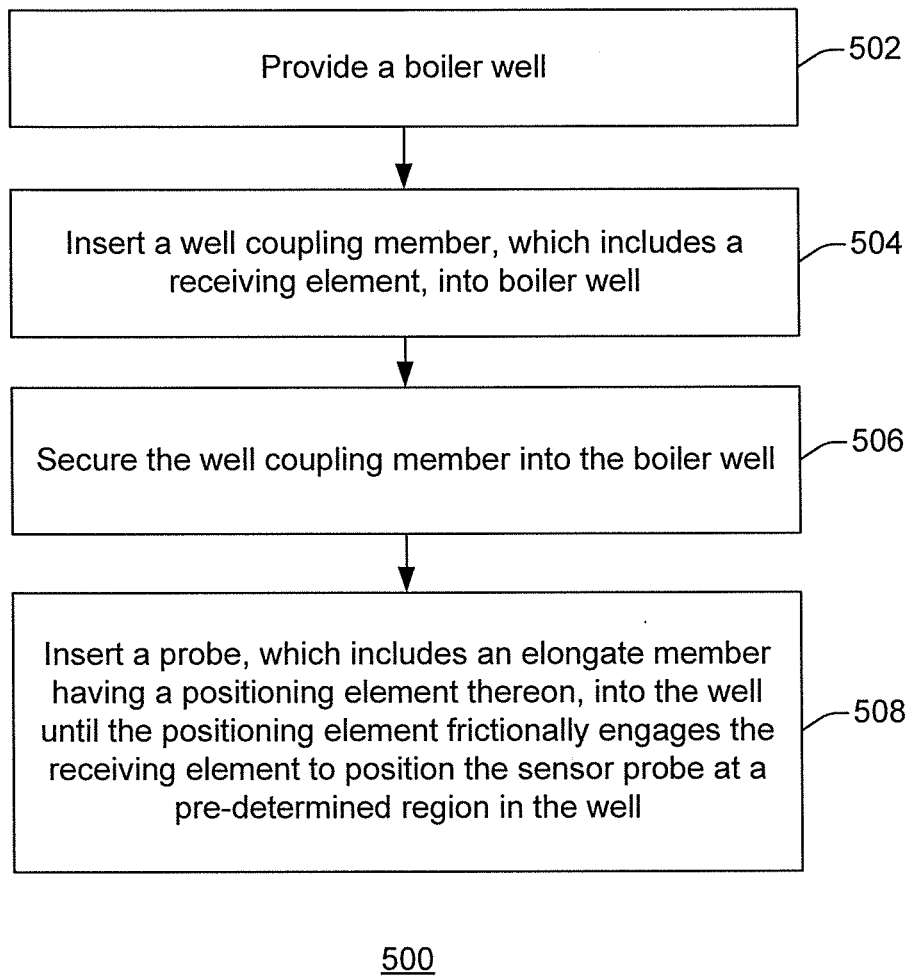
FIG. 5 is a method of installing a sensor probe kit into a boiler well in accordance with some embodiments.

FIG. 5 shows an installation method 500 in accordance with some embodiments. The method starts at 502, wherein a boiler well is provided. At 504, a well coupling member, which includes a receiving element, is inserted into the boiler well. At 506, the well coupling member is securely fixed into the boiler well. At 508, a sensor probe, which includes an elongate member having a positioning element thereon, is inserted into the well until the positioning element engages the receiving element to position the sensor probe at a pre-determined region in the well.

FIGS. 6A-6D set forth an example as a series of cross-sectional views illustrating one example of how method 500 can be carried out. It will be appreciated that although these cross-sectional views show an example of an installation method with regards to particular structural features, the illustrated structural features do not limit method 500 in any way.

Figure 6A:
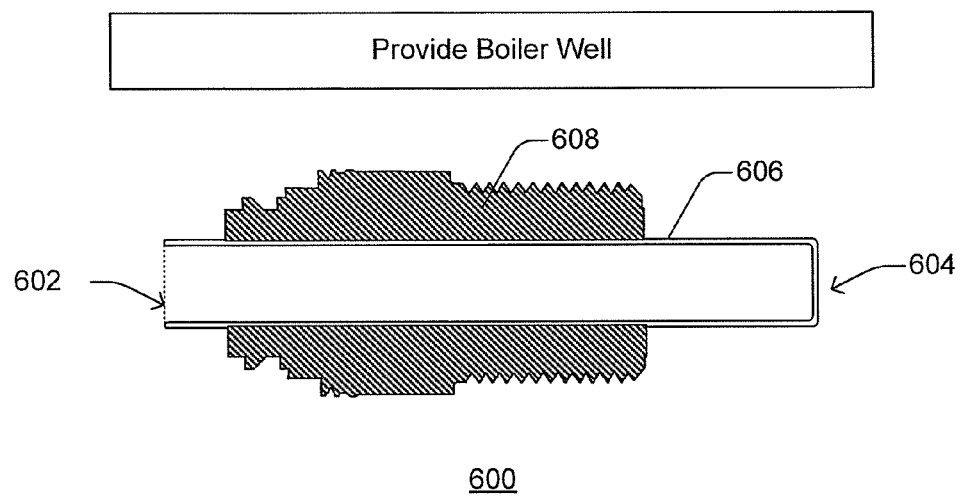
FIGS. 6A-6D are a series of cross-sectional views as a sensor probe is installed into a boiler well in accordance with some embodiments.

In FIG. 6A, a boiler well 600 is provided. The boiler well can include a well opening 602 and a closed end portion 604 with a tubular sidewall 606 extending there between. A threaded body region 608 can help to secure the well 600 to a boiler tank.

Figure 6B:
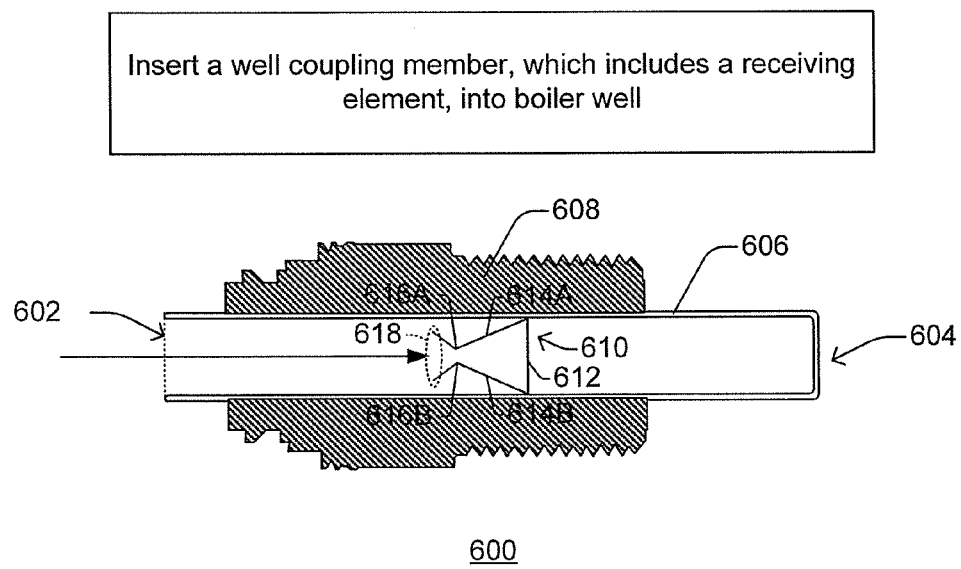

In FIG. 6B, a well coupling member 610 is inserted into the well 600. The well coupling member 610 includes a mounting surface 612 with resilient arms 614A, 614B extending laterally therefrom. In some embodiments, the resilient arms 614A, 614B can include elbows 616A, 616B, which are proximate to a receiving region 618.

Figure 6C:
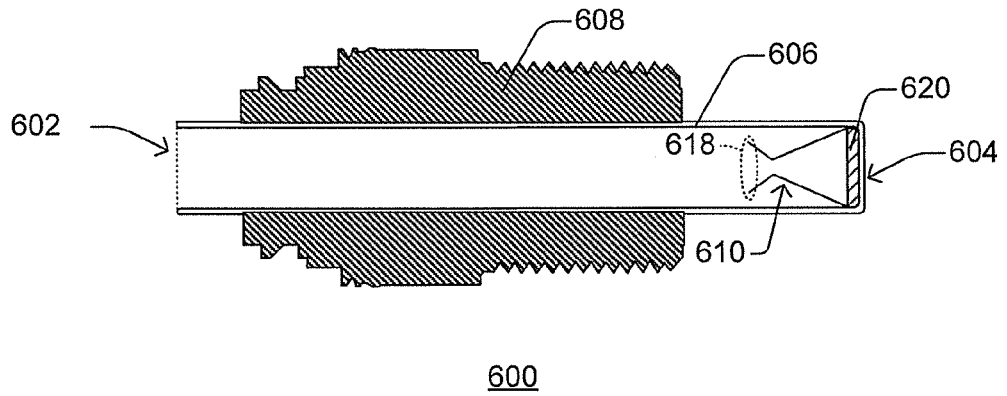

In FIG. 6C, the well coupling member 610 is secured to the closed end portion of the well 604. In many embodiments, a fastening element 620, such as a weld material, a solder material, an epoxy material, a resin, a screw, a bolt, or a rivet, for example, secures the mounting surface 612 to the closed end portion 604 of the well.

Figure 6D:
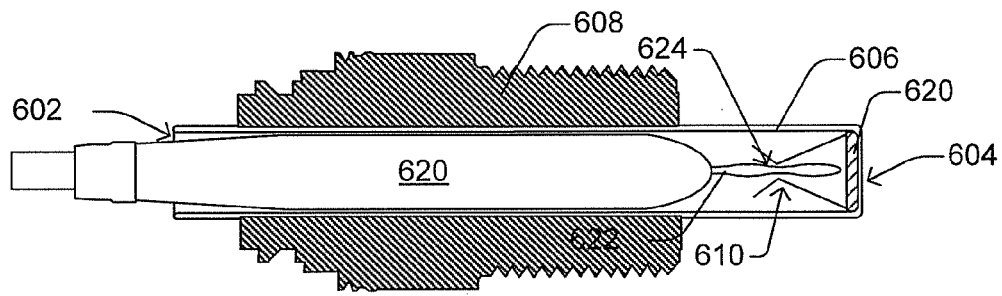

In FIG. 6D, a probe 620, which includes an elongate member 622 having a positioning element 624 thereon, is inserted into the well until the positioning element 624 engages the well coupling member 610. Thus, the positioning element 624 and well coupling member 610 engage one another in a manner that provides positive tactile feedback to an installer to indicate the probe 102 is properly seated at a pre-determined region within the well 108.

Although the disclosure has been shown and described with respect to one or more implementations, equivalent alterations and modifications will occur to others skilled in the art based upon a reading and understanding of this specification and the annexed drawings. For example, although some embodiments of a sensor kit in the form of a LFCO sensor and/or temperature sensor have been described above, it will be appreciated that other types of sensors are also contemplated as falling within the scope of this disclosure. Thus, rather than a sensor probe (e.g., 102) carrying out LWCO sensing functionality, sensor probes can also carry out temperature sensing functionality independent of or in combination with LFCO sensing functionality.

Further, it will be appreciated that identifiers such as "first" and "second" do not imply any type of ordering or placement with respect to other elements; but rather "first" and "second" and other similar identifiers are just generic identifiers. In addition, it will be appreciated that the term "coupled" includes direct and indirect coupling. Thus, if element "a" is "coupled to" element "b", elements "a" and "b" can be directly coupled to one another with no other elements there between but can also be coupled indirectly to one another with element "c" (and/or other elements) there between. The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. In addition, the articles "a" and "an" as used in this application and the appended claims are to be construed to mean "one or more".

Furthermore, to the extent that the terms "includes", "having", "has", "with", or variants thereof are used in either the detailed description or the claims, such terms are intended to be inclusive in a manner similar to the term "comprising."

What is claimed is:

1. A boiler system comprising:

a boiler tank to store a conductive boiler fluid therein;

a well having a well opening, a closed end portion, and a sidewall extending between the well opening and the closed end portion, wherein the well extends into the boiler tank such that the well opening allows access to an interior cavity of the well from outside the boiler tank;

a well coupling member inserted into the well, wherein the well coupling member includes: a base portion mounted to the closed end portion of the well, and one or more resilient arms extending from the closed end portion of the base portion into the interior cavity of the well;

a sensor probe comprising: a probe body having an outer perimeter generally corresponding to an inner perimeter of the well, and a shaft structured to extend from an end of the probe body and terminate near the closed end portion of the well to facilitate sensing of a condition of the conductive boiler fluid in the boiler tank, the shaft having an outer perimeter that is less than that of the probe body; and two or more smoothly curved, bulbous features separated by a neck region and arranged at different locations on the shaft of the sensor probe, wherein at least one of the two or more smoothly curved, bulbous features is structured to frictionally engage and bias the one or more resilient arms as the sensor probe is inserted into the well and thereby position the sensor probe at a pre-determined region entirely within the well when engaged, and wherein the resilient arms form an electrical connection at the neck region.

2. The boiler system of claim 1, further comprising:
a fastening element that secures the well coupling member near the closed end portion of the well.

3. The boiler system of claim 1, further comprising:
a controller configured to monitor an electrical impedance between first and second conductive elements in the boiler system and which are electrically isolated but for the fluid, if any, in the boiler tank;
wherein the controller is placed in electrical contact with the first conductive element via the electrical connection of the neck region.

4. The boiler system of claim 3, wherein the second conductive element is arranged on a fluid supply pipe and is in electrical contact with the controller via at least one wire.

5. The boiler system of claim 1, wherein the sensor probe is configured to measure at least one of: a temperature or a fluid level of the conductive boiler fluid within the boiler tank.

* * * * *